United States Patent [19]

Preussner et al.

[11] Patent Number: 5,362,330
[45] Date of Patent: Nov. 8, 1994

[54] PROCESS FOR THE EMISSION-FREE, IN PARTICULAR CFC-FREE, CLEANING OF PRECISION OPTICS OR OPTICAL ELEMENT GROUPS

[75] Inventors: Elke Preussner, Ritterhude; Heinrich Gruenwald, Gomaringen; Friedrich Scheerer, Solms-Niederbiel, all of Germany

[73] Assignee: Leica Mikroskopie und Systeme GmbH, Wetzlar, Germany

[21] Appl. No.: 971,840

[22] Filed: Feb. 19, 1993

[30] Foreign Application Priority Data

Jun. 19, 1991 [DE] Germany ............... 4120202

[51] Int. Cl.⁵ ............................................. C03C 23/00
[52] U.S. Cl. ........................................ 134/1; 134/2; 134/26; 427/560
[58] Field of Search ............ 134/1, 2, 26; 427/560

[56] References Cited

U.S. PATENT DOCUMENTS

| | | | |
|---|---|---|---|
| 3,868,271 | 2/1975 | Poley et al. | 134/1 |
| 4,187,868 | 2/1980 | Rudolphi | 134/184 |
| 5,071,709 | 12/1991 | Berguier et al. | 428/447 |
| 5,118,355 | 6/1992 | Browning | 134/1 |

FOREIGN PATENT DOCUMENTS

| | | |
|---|---|---|
| 978448 | 4/1951 | France . |
| 978449 | 4/1951 | France . |
| 1074724 | 10/1954 | France . |
| 1144528 | 10/1957 | France . |
| 1083990 | 6/1960 | Germany . |
| 2328164 | 12/1973 | Germany . |
| 320698 | 5/1957 | Switzerland . |
| 760573 | 11/1956 | United Kingdom . |

*Primary Examiner*—Gary P. Straub
*Assistant Examiner*—Thomas G. Dunn, Jr.
*Attorney, Agent, or Firm*—Foley & Lardner

[57] ABSTRACT

An emission-free process is described for cleaning precision optics and components of precision optics including the steps of first pretreating a surface of precision optics or a surface of components of precision optics by cleaning the surface in a cleaning bath to which surfactants have been added as wetting agents, circulating the cleaning bath and exposing the surface to ultrasound exposure. The surface then is rinsed with buffered water containing no wetting agents. The cleaning and rinsing steps then are repeated and the surface is rinsed with buffered, deionized water simultaneously with ultrasound exposure, and then sprayed with deionized water simultaneously with fresh water microfiltration. The pretreated surface then is subjected to short-wave UV radiation, highly accelerated electrons or glow discharge to degrade or convert organic impurities and surfactant residues present on the surface of the pretreated surface into carbon dioxide. The degraded surface then is treated by applying either organosilicon compounds or perfluorinated compounds that form a film having a thickness of between 10 and 100 nm on the glass surface under the pretreating and degrading condition, or by applying a non-volatile, hydrophobic substance that readily degrades under the degrading conditions below. The surface then is sealed by forming a film in the presence of UV or electron radiation to form a surface having a surface sealing layer, and then coated whereby the surface sealing layer is either degraded to metal oxide by glowing during coating or the surface sealing layer is activated by glowing during coating.

16 Claims, No Drawings

PROCESS FOR THE EMISSION-FREE, IN PARTICULAR CFC-FREE, CLEANING OF PRECISION OPTICS OR OPTICAL ELEMENT GROUPS

FIELD OF THE INVENTION

The invention relates to a process for the cleaning of precision optics or components of precision optics, in which no organic solvents are used and accordingly no harmful emissions are produced. In particular, the cleaning process is CFC-free ("CFC"=chlorofluorocarbons).

DESCRIPTION OF RELATED ART

In the manufacture of precision optical equipment, it has long been known to employ classical ultrasound cleaning processes for the cleaning of lenses, prisms and other optical components. In these processes, an aqueous cleaning step is followed by water-removal and then drying. The aqueous cleaning step uses, for example, a temperature-controlled, wetting agent-containing bath or an immersion rinse bath containing deionized water having a conductivity of about 10 μS. The water-removal step comprises an immersion bath comprising alcohol/isopropanol. The drying step is characterized by immersion bath treatment with trichloroethene or vapor bath treatment with trichloroethene vapor. The drying can be carried out, for example, by means of warm air at temperatures between 50° and 80° C. The disadvantages of these classical ultrasound cleaning processes are, inter alia, that there is a risk of explosion when alcohol is used, and that the miscibility with water does not cause displacement of water, which is actually desirable, but merely a reduction in the thickness of the water skin on the glass surface, depending on the temperature and the physicochemical properties of the glass surface. In addition, significantly greater corrosion of the polished glass surface results; this is particularly true in the case of treatment with alcohol vapor. The use of trichloroethene requires considerable equipment complexity for satisfactory vapor extraction. In addition, hydrochloric acid formed by heavy-metal catalysis can cause very considerable corrosion of the glass surface. Finally, stabilizers leave a coating which interferes with the covering or bonding or coating of the glass surface. This results in greatly reduced adhesion and resistance to tropical climates of the correspondingly treated optical components.

In addition, ultrasound cleaning units are known for the purposes described above, in which pretreatment with an aqueous solution is followed by a water-removal step in which alcohol or isopropanol is employed. The method used here is that the water skin adhering to the glass surface is not removed by a dilution effect, but instead by water displacement. In this case, CFCs, for example provided with emulsifiers, do a valuable job.

The urgent necessity for a drastic reduction in consumption of CFCs or, formulated more rigorously, total avoidance of CFCs and other chlorine-containing compounds has for the time being revived the long-known "classical" processes. This return to the processes of the 1950s and 1960s, necessary for global ecological reasons, is naturally, considered in isolation, a technological step backward. It must be emphasized at this point that the known solvents, such as alcohols, ketones, ketoesters and ethers, can only be used for chemically stable types of glass. However, all the known processes have, in addition to the environment-specific disadvantages mentioned above, the following problems: the cleanliness of the glass surfaces depending on the glass type is frequently unsatisfactory, and treatment of the glass surface results in considerable corrosion and thus in a serious drop in quality.

SUMMARY OF THE INVENTION

It is therefore an object of the present invention to provide a process for the environmentally acceptable cleaning of precision components for optics but in which it should additionally be ensured that the cleaning process according to the invention can also be applied to glass types which have low or greatly reduced chemical stability. In particular, the novel process must ensure that no emissions arise from the treatment baths to be used, in particular no CFC emissions.

DETAILED DESCRIPTION

The object is achieved according to the invention by a process of the type mentioned at the outset having the characterizing features of the main claim. Advantageous embodiments arise from the subclaims. The precision optics or components of precision optics or element groups of precision optics which can be subjected to the process according to the invention comprise, for example, optical glasses, plastics, metals or inorganic or organic crystals. The cleaning process can be subdivided into a pretreatment process (preliminary step) and a main cleaning process. The first step is cleaning in a bath containing buffered tap water to which surfactants have been added as wetting agents. This is not conventional pH buffering, but instead buffering in the form of a predefined ion concentration using Na, K, Mg and/or $NH_4$ chlorides in a concentration of between 0.5 and 2 percent by weight. The concentration can be optimized within the stated range depending on the glass types to be cleaned in each case. Circulation of this cleaning bath is provided, with microfiltration additionally being carried out. The use of an ultrasound bath in which the frequency and amplitude are variable, so that a certain frequency range can be covered continuously, is particularly advantageous.

The second process step of the pretreatment procedure involves rinsing in a bath containing buffered tap water. This bath contains no wetting agents. Process steps (a1) and (a2) serve to prevent leaching out of the alkali metal ions present in the glass (reduction in the glass "corrosion"). This is followed by a cleaning bath with an identical chemical composition and use parameters as the cleaning bath in process step (a1). This is followed by rinsing in a bath with an identical chemical action and use parameters as the rinsing bath in process step (a2). The next step is rinsing in a bath containing buffered deionized water. Finally, the optical components pretreated in this way are "showered" with a spray of deionized water, which removes all traces of the buffered deionized water from the glass surface. In this way, the accumulation of salt residues on the glass surface is effectively prevented.

In the remainder of the cleaning process, the organic impurities and the surfactant residues are degraded to carbon dioxide ($CO_2$). This can be carried out either by means of short-wave UV radiation or highly accelerated electron radiation or by means of glow discharge. The treatment atmosphere to be selected in each case can comprise either an oxygen atmosphere under atmospheric pressure conditions and an oxygen atmosphere (up to 5 bar) or an ozone atmosphere (unpressurized) or an ozone atmosphere (up to 2 bar). This is followed by analysis of the glass interfaces for reactions with organic free radicals, degradation reactions on the glass surface and changes in the surface geometry (by means of interferometry).

The next step is the actual main treatment process, in which the water on the glass surface is displaced by means of non-volatile, hydrophobic, reactive substances which, under the conditions mentioned in process steps (a) and (b), form a film having a thickness of between 10 and 100 nm on the glass surface, or by means of non-volatile, hydrophobic substances which are readily degradable under the conditions mentioned in process step (b). The surface is then sealed by film formation with the aid of UV and/or electron radiation, and, finally, the surface is then coated, either the surface-sealing layer being degraded to metal oxide (for example $SiO_2$) by glowing or the surface-sealing layer being activated by glowing.

In an alternative variant of the cleaning process according to the invention, the individual process steps of the main treatment process are the following: firstly, the water on the glass surface, which has accumulated there in particular during the aqueous pretreatment process, is displaced by means of non-volatile, hydrophobic, readily degradable solvents; the water displacer is then degraded or converted into carbon dioxide ($CO_2$) by UV irradiation or by electron irradiation, this being carried out in an oxygen or ozone atmosphere, and, finally, the surface is coated, either the surface-sealing layer being degraded to metal oxide (for example to $SiO_2$) by glowing or the surface-sealing layer being activated by glowing.

Finally, in a further variant according to the invention, it is also possible for the process steps in the main treatment process to be the following: firstly, the components to be cleaned are subjected to a freeze-drying process at temperatures of approximately minus 20° C. and pressures of about 0.001 mbar, followed, as the second process step, by microcleaning by means of UV or electron radiation and glowing in an oxygen or ozone atmosphere. The non-volatile, hydrophobic substances mentioned may be organosilicon compounds, for example polysilanes or polysiloxanes, or perfluorinated compounds.

In a particularly advantageous variant of the process according to the invention, the displacement on the glass surface of the optical components to be cleaned can be carried out by generating a surface which is preferably depleted in alkali metal ions under the influence of a plasma. When the overall cleaning process is complete, assembly to give complete instruments or instrument modules ("ready-for-assembly cleaning") is carried out in the cases in which the optical components are made of metals or plastics. If the optical components are materials made from optical glasses, coating is then carried out, i.e. for example, application of an optical cement or at least one coating layer.

In order to achieve an emission-free cleaning process according to the present invention, further intermediate variants are possible. Thus, individual process steps within the main treatment process, as indicated in the patent claims, can be exchanged for one another or replaced by one another.

We claim:

1. An emission-free process for cleaning precision optics and components of precision optics comprising the steps of:
    (a) pretreating a surface of precision optics or a surface of components of precision optics by
        (i) cleaning said surface in a cleaning bath comprising buffered tap water to which surfactants have been added as wetting agents, circulating said cleaning bath by means of microfiltration and exposing said surface to ultrasound exposure, said ultrasound having variable frequencies and amplitudes to form a cleaned surface;
        (ii) rinsing the cleaned surface of step (a)(i) with buffered water containing no wetting agents to form a rinsed surface, simultaneously rinsing the surface with microfiltered fresh water and exposing the surface to ultrasound exposure, said ultrasound having variable frequencies and amplitudes;
        (iii) repeating step (a)(i);
        (iv) repeating step (a)(ii);
        (v) rinsing the product of step (a)(iv) with buffered, deionized water simultaneously with ultrasound exposure, said ultrasound having variable frequencies and amplitudes; and
        (vi) spraying the product of step (v) with deionized water simultaneously with microfiltered fresh water to form a pretreated surface;
    (b) degrading or converting organic impurities and surfactant residues present on the surface of the pretreated surface into carbon dioxide by a means selected from the group consisting of short-wave UV radiation, highly accelerated electrons and glow discharge to form a degraded or converted surface; and
    (c) treating the degraded or converted surface by:
        (i) displacing water present on said degraded or converted surface either by means of organosilicon compounds or perfluorinated compounds that form a film having a thickness of between 10 and 100 nm on the surface under the pretreating and degrading conditions of steps (a) or (b), or by means of non-volatile, hydrophobic substances that are readily degradable under the degrading conditions of step (b) to form a displaced surface;
        (ii) sealing the displaced surface by forming a metal oxide precursor film in the presence of UV or electron radiation to form a surface having a surface sealing layer; and
        (iii) coating the sealed surface whereby the surface sealing layer is either degraded to metal oxide by glowing during coating or the surface sealing layer is activated by glowing during coating.

2. A process according to claim 1, wherein step (b) is carried out by generating or maintaining one or more conditions selected from the group consisting of an unpressurized oxygen atmosphere, an oxygen atmosphere pressure of up to 5 bar, an unpressurized ozone atmosphere and an ozone atmosphere pressure of up to 2 bar.

3. A process according to claim 1, wherein step (c)(i) is carried out by generating a surface that is depleted in alkali metal ions under the influence of plasma.

4. A process according to claim 1, further comprising the steps of coating the cleaned glass surface product of step (c)(iii) by applying a cement or coating layer.

5. A process according to claim 1, wherein step (c) comprises the following steps:
   (i) displacing water present on said degraded or converted surface either by means of non-volatile hydrophobic solvents that are readily degradable under the degrading conditions of step (b) to form a displaced surface;
   (ii) degrading or converting non-volatile hydrophobic solvents present in the displaced surface into carbon dioxide by UV or electron radiation in an oxygen or ozone atmosphere to form a degraded or converted surface having a surface sealing layer; and
   (iii) coating the degraded or converted surface and the surface sealing layer is either degraded to metal oxide by glowing during coating or the surface sealing layer is activated by glowing during coating.

6. A process according to claim 5, wherein step (c)(i) is carried out by generating a surface that is depleted in alkali metal ions under the influence of plasma.

7. A process according to claim 5, further comprising the steps of coating the cleaned glass surface product of step (c)(iii) by applying a cement or coating layer.

8. The process according to claim 1, wherein step (c) comprises the following steps:
   (i) displacing water present on said degraded or converted surface either by freeze-drying said degraded or converted surface at a temperature of about $-20°$ C. and a pressure of about 0.001 mbar; and
   (ii) microcleaning the surface of step (c)(i) by means of UV or electron radiation and glowing in an oxygen or ozone atmosphere.

9. A process according to claim 2, wherein step (c)(i) is carried out by generating a surface that is depleted in alkali metal ions under the influence of plasma.

10. A process according to claim 2, further comprising the steps of coating the cleaned glass surface product of step (c)(ii) by applying a cement or coating layer.

11. A process according to claim 1, wherein said organosilicon compounds are polysilanes or polysiloxanes.

12. A process according to claim 1, wherein said process does not emit chlorofluorocarbons.

13. A process according to claim 1, wherein said precision optics and components of precision optics are selected from the group consisting of optical glasses, plastics, metals and inorganic or organic crystals.

14. A process according to claim 1, wherein the water is displaced in step (c)(i) by means of a perfluorinated compound.

15. A process according to claim 1, wherein the water is displaced in step (c)(i) by means of non-volatile, hydrophobic substances that are readily degradable under degrading conditions of step (b).

16. A process according to claim 5, wherein said organosilicon compound is polysiloxane.

* * * * *